United States Patent [19]
Berneburg et al.

[11] Patent Number: 5,556,578
[45] Date of Patent: Sep. 17, 1996

[54] AGGREGATE CONTAINING HYDRATION WATER IN SPRAY APPLIED FIREPROOFING

[75] Inventors: Philip L. Berneburg, Cabin John, Md.; Antone J. Freitas, Quincy; Ralph Pisaturo, Wakefield, both of Mass.

[73] Assignee: W. R. Grace & Co.-Conn., New York, N.Y.

[21] Appl. No.: 173,334

[22] Filed: Dec. 23, 1993

[51] Int. Cl.$^6$ .................... G09K 21/00; C04B 111/28
[52] U.S. Cl. .................... 252/604; 252/601; 252/602; 106/695; 106/18.26; 427/403; 427/405; 427/427
[58] Field of Search .................... 252/601, 604; 106/695, 18.26; 427/403, 405, 427

[56] References Cited

U.S. PATENT DOCUMENTS

| | | | |
|---|---|---|---|
| 2,728,681 | 12/1955 | Clipson | 106/97 |
| 2,858,227 | 10/1958 | Rodsky et al. | 106/97 |
| 3,719,513 | 3/1973 | Bragg et al. | 106/114 |
| 3,839,059 | 10/1974 | Rothfelder et al. | 106/115 |
| 3,862,881 | 1/1975 | Taniguchi et al. | 161/162 |
| 3,944,425 | 3/1976 | Magder | 106/40 R |
| 4,066,471 | 1/1978 | Burke | 106/104 |
| 4,082,563 | 4/1978 | Ellis et al. | 106/90 |
| 4,122,059 | 10/1978 | Hansen . | |
| 4,142,911 | 3/1979 | Ellis et al. | 106/97 |
| 4,159,302 | 6/1979 | Greve et al. | 264/333 |
| 4,171,985 | 10/1979 | Motoki et al. | 106/40 R |
| 4,280,848 | 7/1981 | Ellis et al. | 106/90 |
| 4,292,188 | 9/1981 | Barone et al. | 252/62 |
| 4,318,996 | 3/1982 | Magder | 501/84 |
| 4,452,635 | 6/1984 | Noshi et al. | 106/74 |

(List continued on next page.)

FOREIGN PATENT DOCUMENTS

| | | |
|---|---|---|
| 1093103 | 8/1981 | Canada . |
| 157143 | 10/1985 | European Pat. Off. . |
| 241205 | 10/1987 | European Pat. Off. . |
| 94309740 | 4/1995 | European Pat. Off. . |
| 2839080 | 3/1979 | Germany . |
| 3142096 | 5/1983 | Germany . |
| 3728397 | 3/1989 | Germany . |
| 49-33575 | 8/1974 | Japan . |
| 54364 | 8/1992 | Japan . |
| 581084 | 10/1976 | Switzerland . |
| 1068404 | 1/1984 | U.S.S.R. . |
| 1554538 | 10/1979 | United Kingdom . |
| 2092599 | 8/1982 | United Kingdom . |

OTHER PUBLICATIONS

6001 Chemical Abstracts 112: 203814X (1991).
6001 Chemical Abstracts (1992) 117: 54763d.
6001 Chemical Abstracts (1988) 108: 80920m.
A. W. Morgan, et al. "The Use of Phosphate?Almuina Trihydrate Systems in Flame Retarding Vinyl Compoisitions". Monsanto Co., St.Louis Missouri,pp.475–480. Publ.date unknown.
I. Sobolev, et al. "Alumina Hydrate as a Flame–retardant Filler for Thermoplastics". JFF/Fire Retardent Chemistry, Vol. 1 (Feb. 1974)p.13–25.

(List continued on next page.)

*Primary Examiner*—Sharon Gibson
*Assistant Examiner*—Valerie Fee
*Attorney, Agent, or Firm*—Craig K. Leon; William L. Baker

[57] ABSTRACT

Sprayable fireproofing compositions for structural members such as steel columns are provided. The compositions comprise a cementitious binder such as Portland cement, and a hard aggregate containing water of hydration. Such hard aggregates contribute not only to the strength of the fireproofing composition, but also contribute thermally. The product is produced by dry blending a mixture of the cementitious binder and hard aggregate, as well as other optional additives. Upon the addition of water, sprayable slurries are formed which can be pumped to the point of application. An accelerator is added in close proximity to the point of injection. Other additives may also be included, such as starch, adhesives and cement strength enhancers. The slurries adhere to the structural member in the slurried state and after setting to provide excellent fire and heat protection.

10 Claims, 4 Drawing Sheets

U.S. PATENT DOCUMENTS

| | | | |
|---|---|---|---|
| 4,466,836 | 8/1984 | Crump et al. | 106/90 |
| 4,472,201 | 9/1984 | Ochi et al. | 106/98 |
| 4,472,202 | 9/1984 | Nielsen et al. | 106/103 |
| 4,488,909 | 12/1984 | Galer et al. | 106/89 |
| 4,544,409 | 10/1985 | Daussan et al. | 106/18.14 |
| 4,722,866 | 2/1988 | Wilson et al. | 428/411.1 |
| 4,729,853 | 3/1988 | von Bonin | 252/601 |
| 4,751,024 | 6/1988 | Shu et al. | 252/601 |
| 4,802,921 | 2/1989 | Motoki | 106/18.12 |
| 4,816,312 | 3/1989 | Annemaier et al. | 428/74 |
| 5,034,160 | 7/1991 | Kindt et al. | 252/604 |
| 5,035,951 | 7/1991 | Dimanshteyn | 428/446 |
| 5,045,385 | 9/1991 | Luckanuck | 428/220 |
| 5,049,316 | 9/1991 | Kokuta et al. | 252/602 |
| 5,194,087 | 3/1993 | Berg | 106/18.12 |
| 5,234,631 | 8/1993 | Kokuta et al. | 252/602 |

OTHER PUBLICATIONS

P.V. Bonsignore, et al. "Alumina Trihydrate as a Flame Retardant and Smoke Suppressive Filler in Reinforced Polyester Plastics". 29th Annual Technical conference 1974, Sec. 23–C.

Chemical Abstracts 104:69978h of DE 3414153 Jan. 17, 1985.

Chemical Abstracts 104:191803n (1991).

Chemical Abstracts 95:188942x (1981).

Chemical Abstracts 95:8290b (1981).

Chemical Abstracts 94:49097s (1981).

Chemical Abstracts 90:56692c (1972).

Chemical Abstracts 93:169464k (1980).

Chemical Abstracts 84:165657s (1976).

Chemical Abstracts 81:26813q (1974).

Chemical Abstracts 46: 5226d.

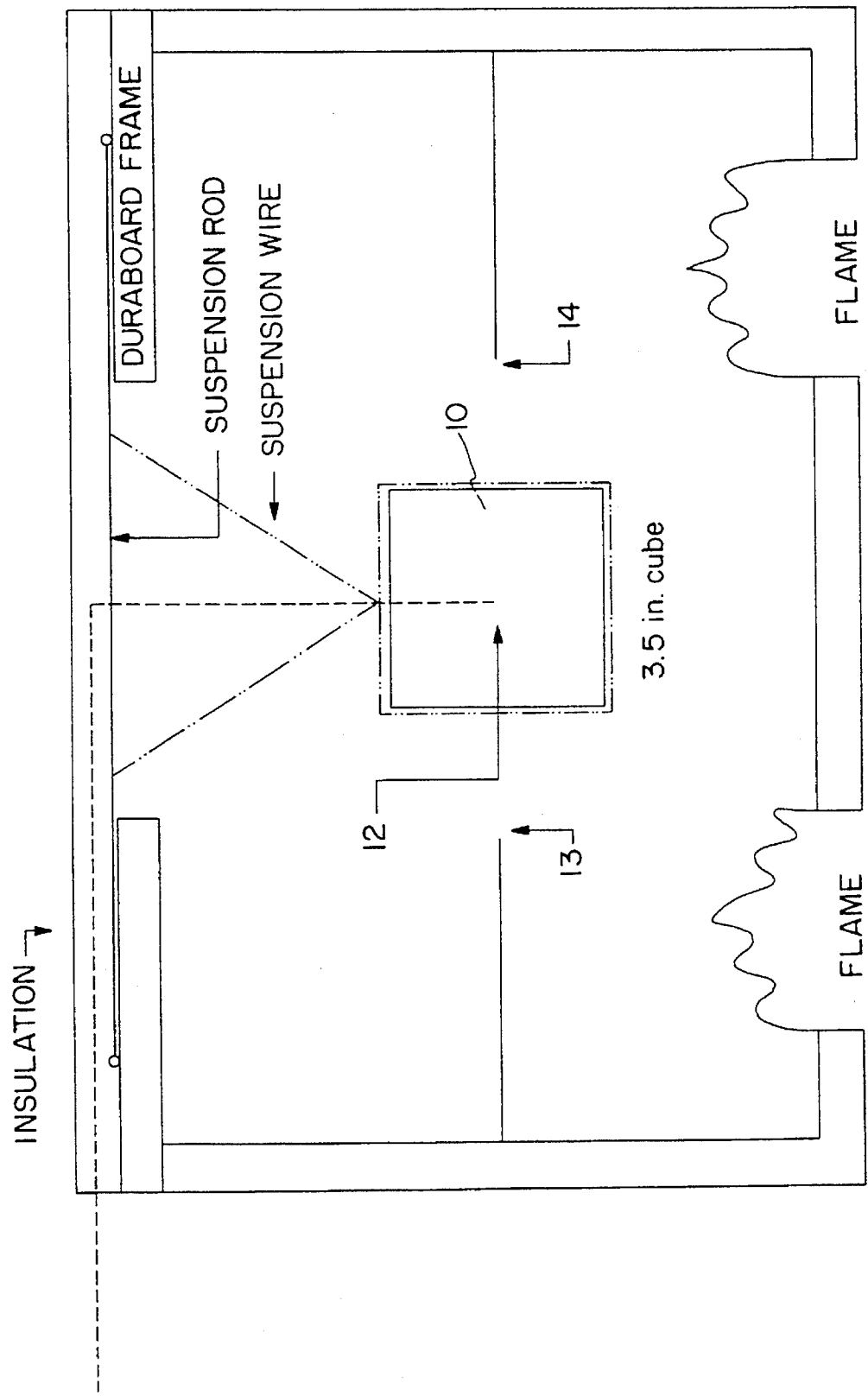

AGGREGATE CONTAINING HYDRATION WATER IN SPRAY APPLIED FIREPROOFING

BACKGROUND OF THE INVENTION

It is well known to spray apply hydraulic cementitious slurries to metal structural members in order to provide a heat resistant coating thereon. U.S. Pat. Nos. 3,719,513 and 3,839,059, the disclosures of which are hereby incorporated by reference, disclose gypsum-based formulations which contain, in addition to the gypsum binder, a lightweight inorganic aggregate such as vermiculite, a fibrous substance such as cellulose and an air entraining agent. Such slurries are generally prepared at ground level and are pumped to the point of application, where they are spray applied to the substrate. Often the point of application exceeds 20 or 30 stories where high rise construction is involved. Accordingly, pumpability of the slurries is an important criteria in their formulation and preparation. Thus, they must be able to hold the large quantity of water that renders them capable of being pumped easily and to great heights, yet they must retain a consistency sufficient to prevent segregation or settling of ingredients and permit adequate yield or coverage of the substrate at a given thickness. The coating mixes must adhere to the substrate both in the slurried state and in the dry state. Also, the mix must set without undue expansion or shrinkage which could result in the formation of cracks that would seriously deter from the insulative value of the dry coating.

U.S. Pat. No. 4,751,024, the disclosure of which is incorporated herein by reference, teaches sprayable cementitious compositions containing shredded polystyrene as a lightweight aggregate in fireproofing compositions. The cementitious binder is preferably gypsum, but may instead be Portland cement. Indeed, Portland cement is typically used as the binder in applications involving high traffic areas, since the cement tends to be stronger than gypsum.

High density (40–42 pcf), high durable, cement-based structural steel fireproofing compositions are primarily used for industrial and/or exterior applications, i.e., applications in which preventing the physical failure of the composition is of the utmost importance. Accordingly, the high density product typically includes, as the hard aggregate, sand, which allows for excellent in-place and application performance. However, the sand does not contribute to the thermal characteristics of the product, and, as a result, a thicker coating is required to obtain the same hourly fireproofing protection as a product that does not include sand aggregate. That is, the sand aggregate provides physical strength to the product, but does not contribute thermally.

Reference to FIG. 1 illustrates the sacrifice in thermal performance when using a cementitious fireproofing composition that includes sand as the hard aggregate. Compositions A, B, C and D are high density (43.8 pcf, 42.2 pcf, 54.7 pcf and 48.5 pcf, respectively) compositions that include sand. Composition E is Carboline 241, available commercially from Carboline Fireproofing Products Division of RPM Company. Carboline 241 is a Portland cement based (35% by weight) product which includes muscovite (35% by weight) and aluminum hydroxide (15% by weight) as the major ingredients. It does not include sand, and has a density of 49.4 pcf. The graph in FIG. 1 illustrates the superior thermal performance of Composition E compared to the compositions utilizing sand as the hard aggregate.

It therefore would be desirable to improve the thermal performance of these and other sprayable cementitious compositions without substantially deleteriously influencing the application and physical properties thereof. The present invention is directed towards such an improvement.

SUMMARY OF THE INVENTION

The problems of the prior art have been overcome by the present invention, which provides a sprayable fireproofing material which exhibits improved thermal performance. In general, an aggregate that contains hydration water is added to the cementitious compositions, thereby not only performing the function of a typical aggregate, but also enhancing the thermal performance of the composition. In high-density cementitious fireproofing compositions, the aggregate containing hydration water partially or completely replaces the sand aggregate.

In its method aspects, the present invention is directed towards a method of spray applying the disclosed cementitious compositions onto a substrate, such as a structural steel member.

BRIEF DESCRIPTION OF THE DRAWINGS

FIG. 4 is a diagram indicating the experimental set-up used in carrying out the Examples set forth below.

DETAILED DESCRIPTION OF THE INVENTION

Figure 1:
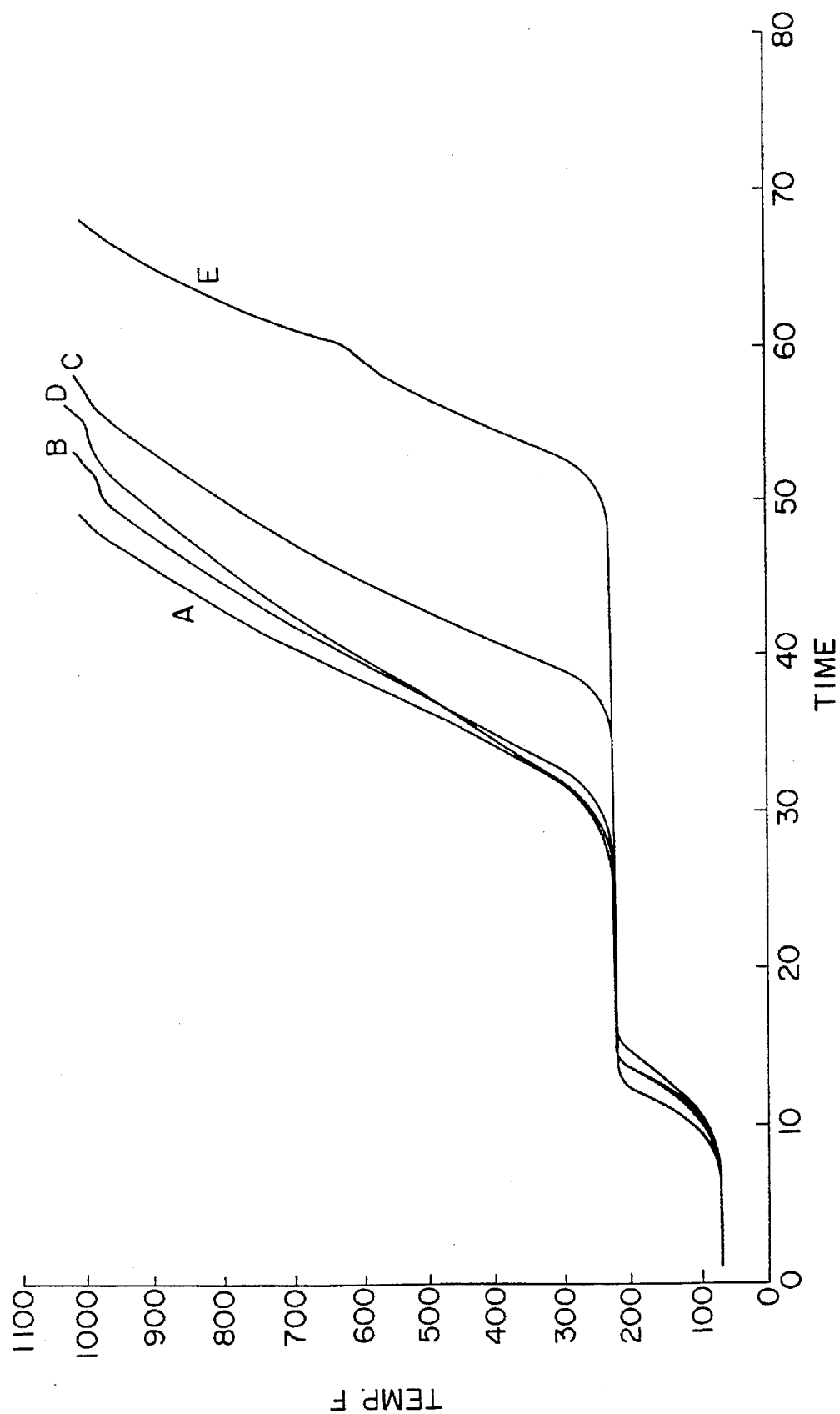
FIG. 1 is a graph showing the thermal performance of various cementitious compositions.

Any suitable hydraulic cement binder can be used in accordance with the present invention, such as gypsum (both non-hydrated and hydrated Plaster of Paris), Portland cement, aluminous cement and pozzolanic cement. The preferred binders are gypsum and Portland cement. Preferably the binder is used in an amount of about 10 to about 60% by weight, more preferably about 40 to about 50% by weight.

The instant fireproofing compositions preferably contain shredded expanded polystyrene as a soft or lightweight aggregate. The "shreddedness" of the expanded polystyrene preferably conforms to a particular particle size distribution expressed in terms of the amount of particles retained on a standard #12 sieve (having 0.0661 inch holes), and the amount of particles passing through a standard #30 sieve and retained on a #325 sieve, as determined in accordance with the method described in U.S. Pat. No. 4,989,464 (the disclosure of which is hereby incorporated by reference). Suitable amounts of particles retained on the #12 sieve, expressed as a weight percent, are from about 0 to about 20%, with from about 0 to about 10% being preferred, and less than about 8% being especially preferred. Suitable amounts of particles passing through a #30 sieve (having 0.0234 inch holes) and retained on a #325 sieve (having 0.0017 inch holes) are less than about 40% by weight, preferably less than about 30%, with about 14–20% being especially preferred. The desired amount of particles retained by the #12 sieve depends in part on the amount of particles passing through the #30 sieve and retained by the #325 sieve. Where the amount of particles retained by the #12 sieve is less than about 8% by weight, it is preferred that the amount of particles passing through the #30 sieve and retained by the #325 sieve be less than about 30% by weight. The amount of polystyrene present in the cementitious formulations in accordance with the present invention is from about 0.5 to about 3.5 percent, preferably about 1.0%.

Since the instant fireproofing compositions are typically transported to the building site as dry mixtures, and are formed into slurries upon the addition of an appropriate amount of water, the preparation and application processes may span many hours and thus the setting time of the mix is generally heavily retarded to provide an acceptable field pot life. This retarding in the mixer contradicts the desired quick setting time upon spray application, and thus a delicate balance of retarding and accelerating is difficult to achieve. Obviously, were the mixture to stiffen substantially in the hopper, it would be rendered non-pumpable and therefore would be useless for the intended application. Any set accelerating agent capable of satisfactorily offsetting the retardation of the slurry without deleteriously effecting the same or the substrate which is the subject of the application can be used. Examples of useful accelerators include aluminum sulfate, aluminum nitrate, ferric nitrate, ferric sulfate, potassium sulfate, sulfuric acid, sodium carbonate, sodium bicarbonate and acetic acid, with alum being especially preferred. Preferably aluminum sulfate set accelerator is used as a 37% solution and is injected into the slurry at the spray nozzle at a level up to 3%.

The present invention is applicable to Portland cement types 1 through 5, although type 1 is especially preferred. For a mid-density product, the dry mix of such compositions has a bulk density in the 10 to 18 pcf range, preferably in the 12 to 15 pcf range, and the final dry density of the product is in the 15 to 30 pcf range, preferably the 22 to 26 pcf range. The dry material is mixed with water at a ratio of 1.3:1–1.6:1 (water:solids). For the high density product, the final density is preferably about 40–42 pcf. Additional optional additives and ingredients may be added, such as glass fibers (chopped fiberglass) in amount of about 0.5 to 2.5%, preferably about 1.0%, to control shrinkage; methyl cellulose or other suitable thickeners known to those skilled in the art in an amount of from about 2 to about 5%, preferably about 2.1%; air stabilizers such as hydroxypropyl methyl cellulose (THEM) in an amount of from about 0.1 to about 3%; air entrainers, such as alcohol sulfate sodium salt in an amount of from about 0.1 to about 3%; polyvinyl acetate in an amount from 0 to about 5%; clay in an amount of from about 3 to about 6%; and a biocide to inhibit bacterial formation.

The present invention is also applicable to lighter weight fireproofing compositions (16–18 pcf) in which gypsum is the cementitious binder. For such applications, low density aggregates having hydration water are preferable.

In the preferred embodiment of the present invention, the aggregate having hydration water is used in cementitious fireproofing compositions having a density in the 40–42 pcf range.

Suitable aggregates having hydration water include coarse ground gypsum, bauxite, cement clinker, brucite and granular aluminum hydroxide. Bauxite is preferred for its excellent thermal effectiveness. The aggregates can be used alone or in combination. The aggregates contribute to the effectiveness of a structural steel fireproofing by enhancing its ability to act as an insulating barrier between the fire and the steel, and by absorbing energy via an endothermic reaction. The endothermic reaction takes place when the chemically bound water within the aggregate is driven off during heating. The aggregate should be used in an amount of about 10 to about 60% by weight, preferably about 40% by weight, and should have the following sieve analysis:

| Screen # | Retained-Cumulative |
| --- | --- |
| +40 | 1% maximum |
| −40, +60 | 0–35% |
| −60, +100 | 65% minimum |
| −100, +200 | 95% minimum |

The aggregate can replace some or all of the sand aggregate, and/or some of the cementitious binder.

EXAMPLES

In the following examples, the effectiveness of aggregates containing hydration water when used in structural steel fireproofing was determined by the following method. The fireproofing formulations were mixed with water, pumped and sprayed with field-typical equipment directly into a cube mold. Upon curing, the cube 10 was removed from the mold and oven dried at 120° F. until a constant weight was obtained.

The cube 10 was then suspended in a 1' x 2' oven as shown in FIG. 4. One thermocouple 12 was positioned in the center of the cube in order to measure the heat transmission through the material. Two additional thermocouples 13, 14 were placed in the oven on either side of the cube 10 in order to monitor the oven temperature.

The oven was then heated using the standard ASTM E-119 time temperature curve. The testing was maintained until the thermocouple 12 inside the cube measured 1000° F. The output from the three thermocouples was recorded using a standard electronic data collection device.

The fireproofing compositions in accordance with the present invention that were tested in the examples had the following formulation:

| Component | Formulation Tested (%) |
| --- | --- |
| Aggregate | 35–45 |
| Portland cement | 40–50 |
| Shredded polystyrene | 0.5–1.5 |
| Chopped fiberglass strand | 1–3 |
| Pulverized cellulose | 1.5–3 |
| Hydroxypropyl methyl cellulose | 0.1–0.5 |
| Alcohol sulfate sodium salt | 0.1–0.5 |
| Polyvinyl acetate | 1.5–3 |
| Attapulgite/Sepiolite clay | 3–6 |

FIG. 1 illustrates the thermal performance of a high density fireproofing compositions A–D (densities of 43.8, 42.2, 48.5 and 54.7 pcf, respectively) having sand aggregate, versus a fireproofing composition based on Carboline 241 having a density of 49.4 pcf but no sand aggregate (E). The graph demonstrates the improved thermal performance achieved when sand is not used as the hard aggregate.

Figure 2:
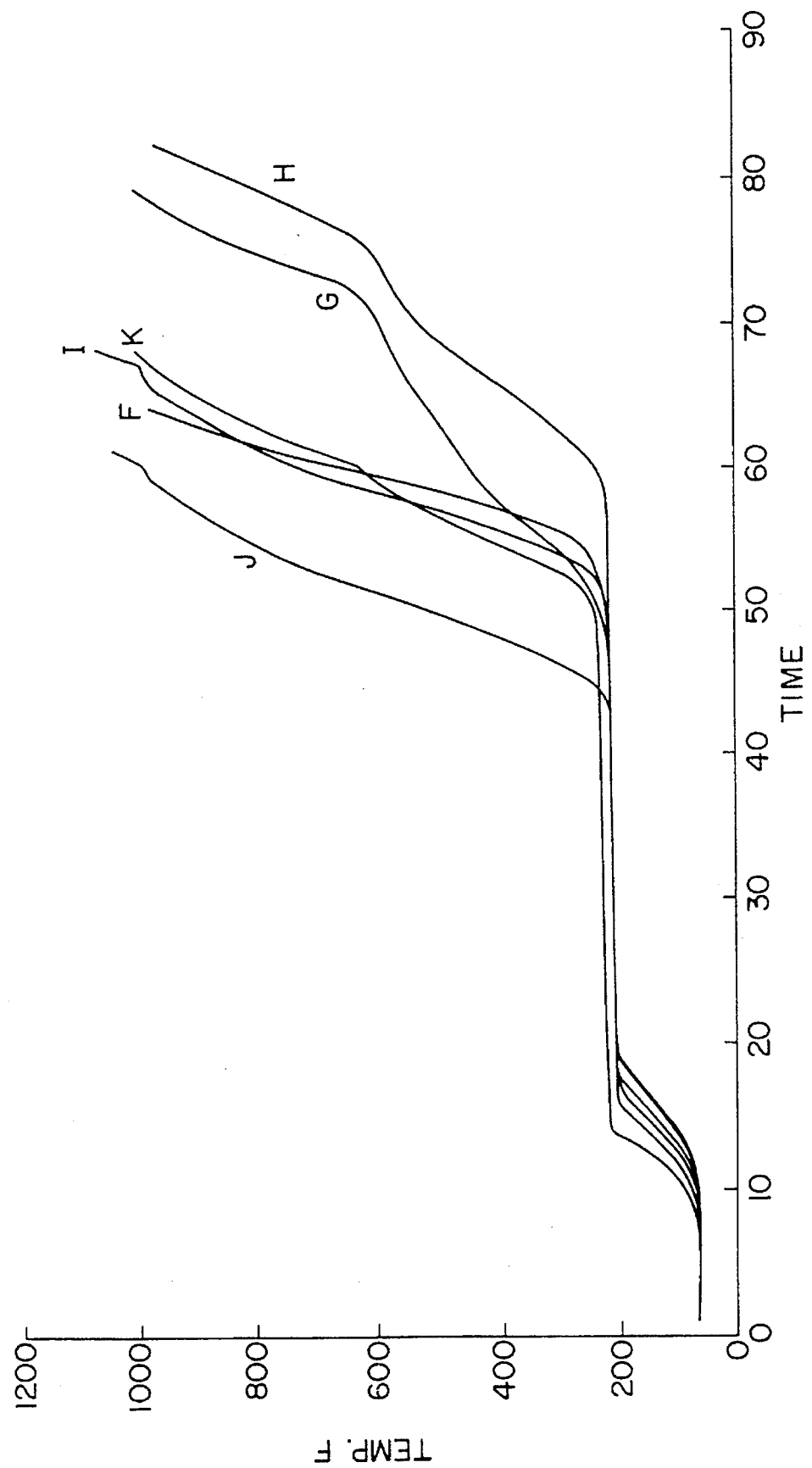
FIG. 2 is a graph showing the thermal performance of various cementitious compositions.

FIG. 2 is a graphical comparison of the thermal performance of fireproofing compositions according to the present invention (F–J) versus a fireproofing composition based on Carboline 241 containing no sand aggregate and no aggregate having water of hydration (K). The particular aggregates and the density of the composition are shown in the Figure. The thermal performance of compositions G and H were superior to composition K, while compositions F and I were comparable to composition K.

Figure 3:
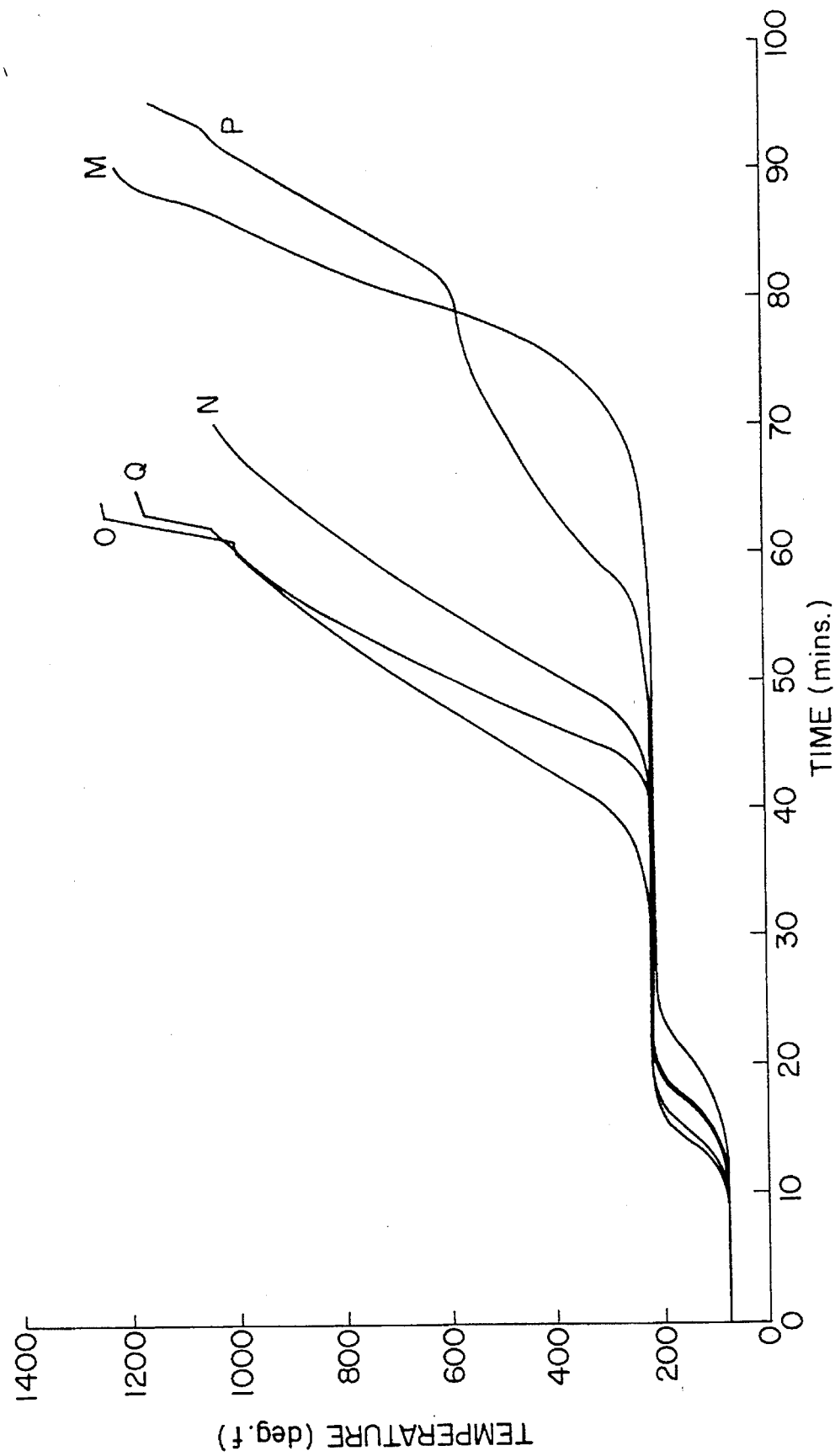
FIG. 3 is a graph showing the thermal performance of various cementitious compositions.

FIG. 3 is a graphical illustration of various fireproofing compositions including aggregates having water of hydration, versus the prior art composition (O) having sand as the only hard aggregate. Compositions M, N and P exhibited good to excellent thermal performance.

What is claimed is:

1. A sprayable fireproofing composition, comprising a hydraulic cementitious binder, said binder being used in an amount of at least 10% dry weight in said composition, and bauxite as a hydration water-containing hard aggregate, said bauxite having the following sieve analysis:

| Screen # | % Retained-Cumulative |
| --- | --- |
| +40 | 1% maximum |
| −40, +60 | 0–35% |
| −60, +100 | 65% minimum |
| −100, +200 | 95 minimum. |

2. The sprayable fireproofing composition of claim 1, further comprising shredded polystyrene.

3. A dry composition comprising a hydraulic cementitious binder and bauxite, said binder being used in an amount of at least 10% dry weight in said composition, as a hydration water-containing hard aggregate, said bauxite having been subjected to sieving to reduce particle size whereby after incorporation of said sieved bauxite into stud composition, said composition provides, upon the addition of water, a settable slurry which is capable of spray application to a steel substrate and which, after spray application, is adherent to said substrate in the slurried state and after setting.

4. A method of spray applying a sprayable fireproofing composition to a steel substrate comprising: dry blending a mixture comprising a hydraulic cementitious binder and bauxite as an aggregate containing water of hydration, said bauxite having the following sieve analysis:

| Screen # | % Retained-Cumulative |
| --- | --- |
| +40 | 1% maximum |
| −40, +60 | 0–35% |
| −60, +100 | 65% minimum |
| −100, +200 | 95 minimum; | adding water thereto to form a sprayable slurry; and spraying said slurry onto said substrate.

5. The method of claim 4 further comprising conveying said slurry to a spray nozzle; introducing a set accelerating agent into said slurry in close proximity to said nozzle, before spraying said slurry onto said substrate.

6. The method of claim 5 wherein said set accelerating agent comprises alum.

7. The method of claim 4 wherein said sprayable slurry further comprises a shredded polystyrene aggregate.

8. The method of claim 4 wherein said sprayable slurry is sprayed onto a substrate comprising steel, said method further comprising conveying said slurry to a spray nozzle, and introducing a set accelerating agent into said slurry in close proximity to said nozzle.

9. The method of claim 4 wherein said cementious binder comprises at least 10% dry weight of the composition.

10. A method of spray applying a sprayable fireproofing composition to a steel substrate comprising: dry blending a mixture comprising a hydraulic cementitious binder and bauxite as an aggregate containing water of hydration, said binder comprising at least 10% dry weight of said composition, and said bauxite being sieved to reduce particle size prior to incorporation of said bauxite into said composition, whereby said composition, upon addition of water thereto, is operative to form a sprayable slurry that adheres to substrates in the slurried state and after setting.

* * * * *